United States Patent [19]

Okumura et al.

[11] Patent Number: 5,796,447
[45] Date of Patent: Aug. 18, 1998

[54] LIQUID CRYSTAL DISPLAY HAVING MULTIPLE LIQUID CRYSTAL LAYERS PER PIXEL IN WHICH ELECTRODE PAIRS ARE DRIVEN AT DIFFERENT PHASES OR FLOAT

[75] Inventors: Haruhiko Okumura, Fujisawa; Hisao Fujiwara, Yokohama; Goh Itoh, Tokyo; Akira Kinno, Yokohama, all of Japan

[73] Assignee: Kabushiki Kaisha Toshiba, Kawasaki, Japan

[21] Appl. No.: 712,666

[22] Filed: Sep. 13, 1996

[30] Foreign Application Priority Data

Sep. 13, 1995 [JP] Japan ................... 7-235357

[51] Int. Cl.⁶ .................... G02F 1/133; G02F 1/1347
[52] U.S. Cl. ...................... 349/33; 349/74; 349/77
[58] Field of Search ....................... 349/74, 77, 33

[56] References Cited

U.S. PATENT DOCUMENTS 3,645,604  2/1972  Ngo ........................... 349/77
5,625,474  4/1997  Aomori et al. ............... 349/79

FOREIGN PATENT DOCUMENTS

3-83014  4/1991  Japan.

*Primary Examiner*—William L. Sikes
*Assistant Examiner*—Walter Malinowski
*Attorney, Agent, or Firm*—Oblon, Spivak, McClelland, Maier & Neustadt, P.C.

[57] ABSTRACT

A plurality of pixels are arrayed in a matrix format on the liquid crystal panel of a liquid crystal display. GH liquid crystal layers and transparent electrodes for displaying a plurality of different colors are alternately stacked on a reflecting plate, and therefore each pixel has three liquid crystal layers. Pieces of potential information supplied to the respective liquid crystal layers are controlled by switching elements connected to signal lines and scanning lines. The signal lines and the scanning lines are respectively connected to driving ICs, which are connected to a signal processing circuit. In each pixel, while the potential information of one liquid crystal layer is controlled, the remaining liquid crystal layers are set in a floating state.

20 Claims, 10 Drawing Sheets

LIQUID CRYSTAL DISPLAY HAVING MULTIPLE LIQUID CRYSTAL LAYERS PER PIXEL IN WHICH ELECTRODE PAIRS ARE DRIVEN AT DIFFERENT PHASES OR FLOAT

BACKGROUND OF THE INVENTION

1. Field of the Invention

The present invention relates to a liquid crystal display and, more particularly, to a reflection liquid crystal display.

2. Description of the Realted Art

Displays for OAs, such as a personal computer, a wordprocessor, an EWS, and the like, displays for a desktop calculator, an electronic book, an electronic notebook, a PDA, and the like, or displays for a portable television, a portable telephone, a portable facsimile device, and the like must be battery-driven, and must be low in power consumption. Conventionally, as a low-profile display, a liquid crystal display (LCD), a plasma display, a flat CRT, and the like have been known. Of these displays, the LCD is most suitable in consideration of the power consumption and is put into practical use.

An LCD for allowing a user to directly view the display surface of the display is called a direct-view LCD. The direct-view LCDs include a transmission LCD which incorporates a light source such as a fluorescent lamp on its back side, and a reflection LCD using ambient light. Since the former requires a back light, it is not suitable for a reduction in power consumption. This is because the power consumption of the back light is 1 W or more, and the LCD can be used for only 2 to 3 hours by battery driving. Therefore, the latter reflection LCD is most popularly used as the display of a portable information equipment.

In the reflection LCD, a reflecting plate consisting of an aluminum foil having a satin surface, and a polarizing plate overlap each other and are adhered to a glass substrate on a back side. Since such a reflection LCD is of a non-light-emitting type, its power consumption is low. However, the conventional reflection LCD can provide neither a blight, paper-white display nor a vivid color display, as a matter of course. This is a serious technical problem in development of the reflection LCD whose image quality copes with that of the transmission TFT-LCD.

In the reflection LCD, an ECB (Electrically Controlled Birefringence) mode, a GH (Guest Host) mode, a TN (Twisted Nematic) mode, and the like are used.

The ECB and TN modes require polarizing plates. Since the polarizing plate has an optical transmittance of about 40%, the optical utilization efficiency is low. In the reflection display, the brightness of the display is evaluated on the basis of the reflectivity, which represents the percentage of reflected components with respect to light incident on the display. This reflectivity is normally measured by integrating diffused reflected components with an integrating sphere. For example, a newspaper has a reflectivity of about 60%, wood-free paper has a reflectivity of about 80%, and a powder such as a magnesium oxide powder or a barium sulfate powder has a reflectivity of 99% or more.

In contrast to this, if the polarizing plate is arranged on the LCD, a reflectivity of 40% or more cannot be expected, and a problem is posed in terms of display performance. A paper-white display requires a reflectivity of 60% or more.

In terms of the optical utilization efficiency, the GH modem, which requires no polarizing plate, is most promising. When a color display is performed in this mode, three GH cells respectively containing cyan, magenta, and yellow coloring agents must be stacked. Generally, to realize a color display having a wide color reproduction range on a reflection LCD, a method of stacking GH cells is most preferable. To the contrary, a single-color display over the entire surface cannot be realized with a parallel arrangement of red (R), green (G), and blue (B), or a parallel arrangement of cyan, magenta, and yellow in which three GH cells are laterally arranged. Therefore, the color reproduction range is inevitably narrow.

When a dot matrix display is to be obtained by the three stacked GH cells, image information must be transferred in units of a pixel. Matrix driving methods include simple matrix driving and active matrix driving. Since the former requires a steep V-T (voltage-transmittance) characteristic, it is not suitable for the GH liquid crystal in which the content of liquid crystal is low due to the presence of coloring agents. The latter includes an MIM type using a diode as an active element, and a TFT type using a transistor as an active element. In the MIM type, if the number of pixels is increased, the effective voltage applied to one pixel decreases and may be below 5V. For this reason, the MIM type is not suitable for driving the current GH liquid crystal in consideration of the V-T characteristic of the GH liquid crystal. In contrast to this, the TFT type is suitable for the GH liquid crystal because the voltage of one pixel is arbitrarily set.

Figure 13:
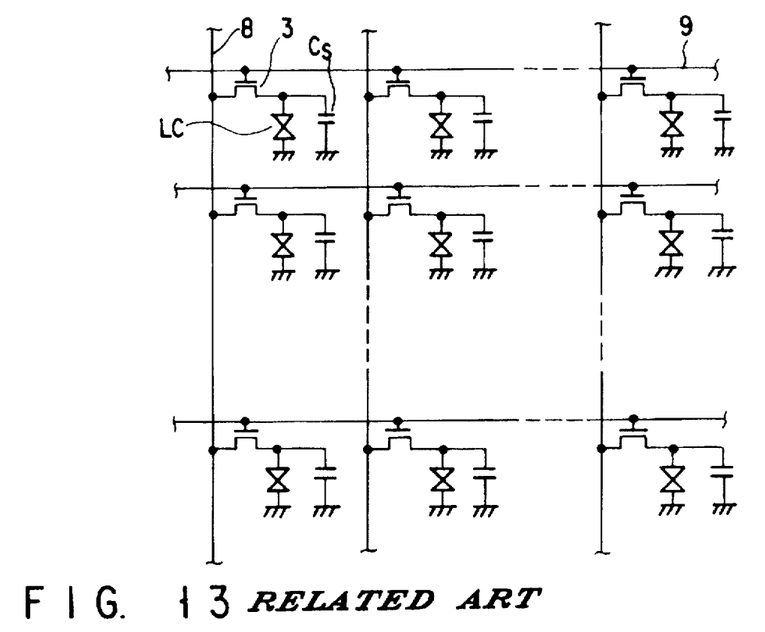
FIG. 13 is a circuit diagram showing the configuration of the display region of a conventional TFT-LCD.

As shown in FIG. 13, the TFT type normally comprises liquid crystal layers LC, auxiliary capacitances Cs, thin film transistors (TFTs) 3, signal lines 8, scanning lines 9, a signal line driving IC (not shown), and a scanning line driving IC (not shown). When the TFTs 3 are in the ON state, the potentials of the signal lines are applied to pixel electrodes to change the molecular alignment states of the liquid crystal layers on the basis of potential differences with respect to counter electrodes. The signal line driving IC supplies a signal capable of controlling the liquid crystal layers to the signal lines. A driving IC with a lower breakdown voltage can be increased in driving frequency, reduced in cost, and reduced in size. For this reason, it is desirable to suppress the driving amplitude to be small.

Figure 14:
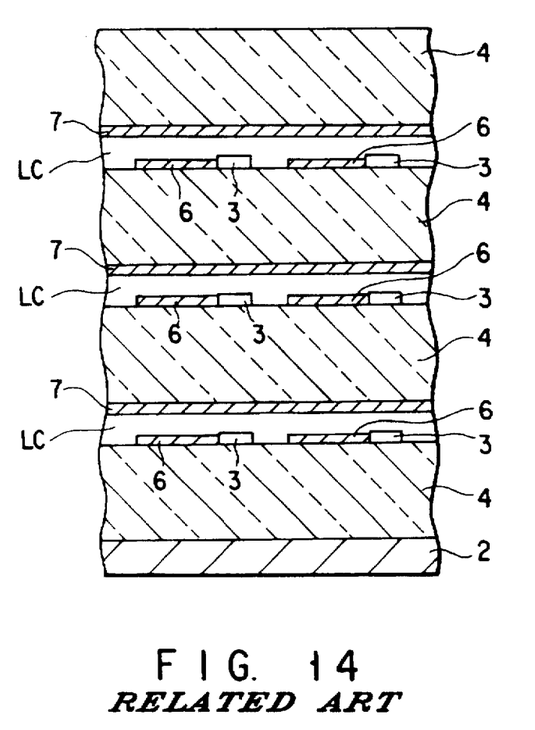
FIG. 14 is a sectional view showing a conventional liquid crystal panel of a GH mode having an arrangement in which three layers overlap.

FIG. 14 shows an example of a cell structure in which three GH liquid crystal layers LC are sandwiched between four glass substrates 4. In this case, since the total glass thickness (one normally has 0.3 mm or more) is large, the effective visual angle is small. Further, a total of six transparent electrodes are used as pixel electrodes 6 and counter electrodes 7. That is, light incident from above must pass through the transparent electrodes twelve times while the light is reflected by a reflecting plate (electrode) 2 and emerges upward. The light attenuates to reduce the light amount and decrease the reflectivity.

Figure 15A:
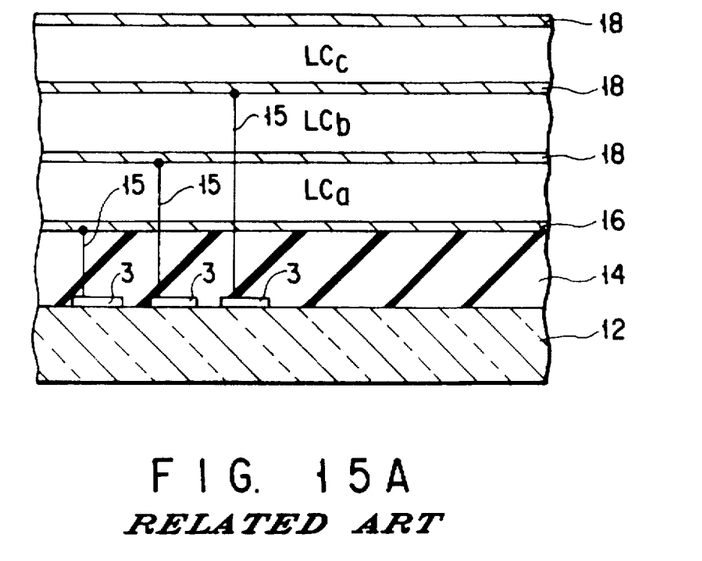
FIGS. 15A and 15B are a sectional view showing a conventional liquid crystal panel of a GH mode in which GH liquid crystal layers and transparent layers are alternately stacked, and a circuit diagram showing the configuration of one pixel, respectively.

To solve this problem, a structure as shown in FIG. 15A is proposed. In FIG. 15A, a reflecting plate (pixel electrode) 16 is arranged via an insulating film 14 on a glass substrate 12 on which an array of TFTs 3 is formed. GH liquid crystal layers LCa to LCc and transparent electrodes (pixel electrodes or counter electrodes) 18 are alternately stacked thereon. An arithmetic circuit determines in advance a voltage to be applied to the four electrodes 16 and 18 which respectively sandwich the three liquid crystal layers LC therein.

Figure 15B:
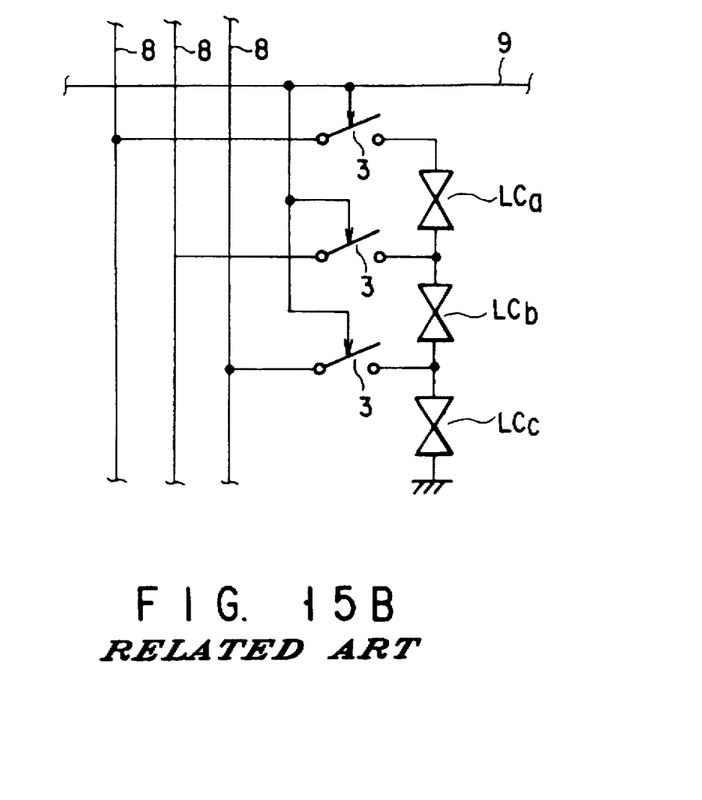

To drive the GH liquid crystal layers in this structure, various methods are considered, and an equivalent circuit of one type is shown in FIG. 15B. More specifically, the three signal lines 8, one scanning line 9, and the three TFTs 3 are arranged in one pixel. This is because one pixel has three liquid crystal capacitances for cyan, magenta, and yellow. Pieces of information sent to the respective signal lines are transmitted to the reflecting plate (pixel electrode) 16 and the transparent electrodes (pixel electrodes) 18 via corresponding copper-plated columns 15 (see FIG. 15A).

However, these cells are equivalent to a circuit as shown in FIG. 15B. When the cells are actually driven, the respective GH liquid crystal layers LC operate differently from each other. That is, the uppermost layer LCc has a constant potential on one side and one switch active element on the other side, and each of the remaining layers LCa and LCb has active elements on two sides. For this reason, when the switches ideally operate, each of the layers LCa and LCb is free from the influence of a feedthrough signal due to a gate signal because the switches on the two sides are simultaneously turned off. However, since the layer LCc has the constant potential on one side, the layer LCc is affected by the feedthrough, similar to a liquid crystal display having a conventional structure. As a result, the respective layers have different DC and flicker components due to the feedthrough, resulting in a degradation in display image quality. In addition, when the switches do not ideally operate, DC and flicker components vary in accordance with the switches. The three layers are set in different pixel potential states, resulting in a larger degradation in image quality.

In the structure shown in FIGS. 15A and 15B, each transparent electrode 18 serves as both a pixel electrode and a counter electrode. A voltage (e.g., 15V) for driving the GH liquid crystal layer is applied to each layer. To display one pixel, a driving voltage three times as high as the voltage for driving the GH liquid crystal layer is required. Therefore, the signal line driving IC for driving the signal lines 8 must be an IC capable of outputting the driving voltage three times the voltage for driving the GH liquid crystal layer. It becomes difficult to increase the speed and reduce the cost.

SUMMARY OF THE INVENTION

It is, therefore, an object of the present invention to prevent a degradation in display image quality in a liquid crystal display wherein liquid crystal layers are stacked.

It is another object of the present invention to allow the use of a signal line driving IC with a low breakdown voltage in the liquid crystal display wherein the liquid crystal layers are stacked.

According to a first aspect of the present invention, there is provided a liquid crystal display, comprising:

- a plurality of pixels arranged in a matrix format, each pixel having a plurality of liquid crystal layers and a plurality of transparent electrodes which are alternately stacked on a first electrode functioning as a reflecting plate to display a plurality of different colors, and switching means connected to the first electrode and the transparent electrodes to control potential information supplied to the liquid crystal layers;
- a plurality of signal lines connected to the switching means of the pixels to supply an image signal to the pixels;
- a plurality of scanning lines connected to the switching means of the pixels to supply a scanning signal for selecting the pixels; and
- control means for driving the signal lines and the scanning lines, the control means setting remaining liquid crystal layers in a floating state while controlling potential information of one liquid crystal layer in each pixel.

According to a second aspect of the present invention, there is provided a liquid crystal display, comprising:

- a plurality of pixels arranged in a matrix format, each pixel having a plurality of liquid crystal layers and a plurality of transparent electrodes which are alternately stacked on a first electrode functioning as a reflecting plate to display a plurality of different colors, and switching means connected to the first electrode and the transparent electrodes to control potential information supplied to the liquid crystal layers;
- a plurality of signal lines connected to the switching means of the pixels to supply an image signal to the pixels;
- a plurality of scanning lines connected to the switching means of the pixels to supply a scanning signal for selecting the pixels; and
- control means for driving the signal lines and the scanning lines, the control means controlling the respective liquid crystal layers in each pixel such that phases of their driving signals are different.

According to the first aspect of the present invention, a pixel potential can be written in only an arbitrary liquid crystal layer. The potentials of liquid crystal layers not subjected to write processing are shifted while keeping potential differences between pixel electrodes and counter electrodes. Therefore, the signal line potential to write data in an arbitrary liquid crystal layer is only a voltage (e.g., 15V) required to control the liquid crystal layer, and the driving voltage three times the voltage for driving the GH liquid crystal layer is not required. Therefore, a high-speed, low-cost driving IC with a low breakdown voltage can be used as a signal line driving IC.

According to the second aspect of the present invention, feedthrough voltages across the respective layers become equal. Therefore, flicker, sticking, and a change in luminance can be improved for each color.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1A:
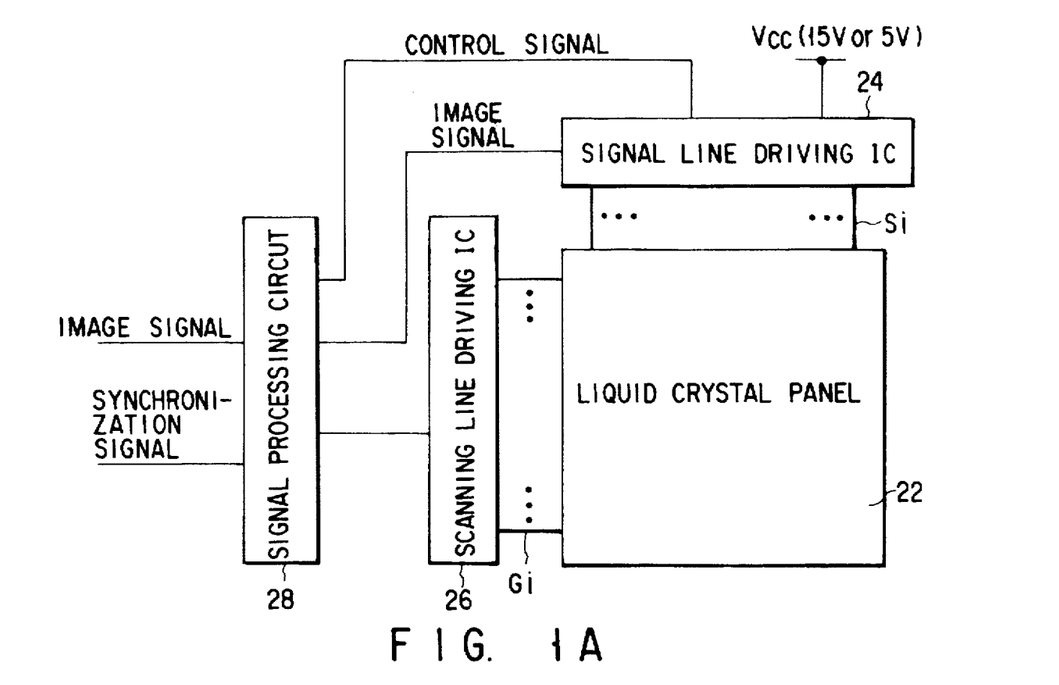
FIGS. 1A and 1B are a block diagram schematically showing the arrangement of the main part of a liquid crystal display according to the present invention, and a sectional view schematically showing the arrangement of a liquid crystal panel of a GH mode, respectively.

FIG. 1A shows the arrangement of the main part of a liquid crystal display according to the present invention. A plurality of pixels are arrayed in a matrix format defined by rows and columns of the pixels on a liquid crystal display panel 22 so as to correspond to the intersections of signal lines Si ("i" indicates a positive integer in this specification) and scanning lines Gi. The signal lines Si are connected to a signal line driving IC 24, and the scanning lines Gi are connected to a scanning line driving IC 26. The signal line driving IC 24 and the scanning line driving IC 26 are connected to a signal processing circuit 28, which supplies a predetermined driving signal.

Figure 1B:
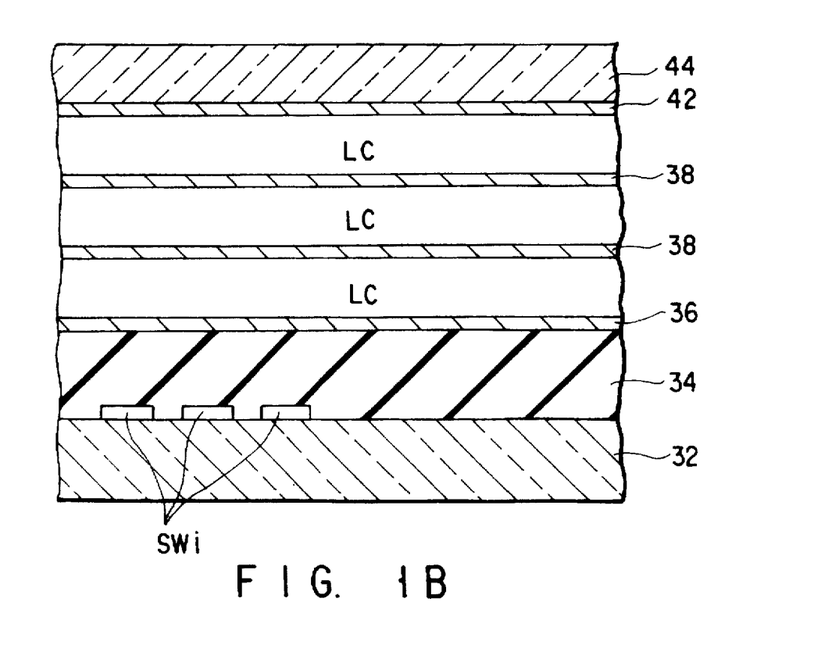

FIG. 1B schematically shows a sectional view of the liquid crystal display panel 22 of a GH mode. For example, a reflecting plate (pixel electrode) 36 is arranged via an insulating film 34 on a glass substrate 32 on which an array of active elements, i.e., switching elements SWi each consisting of a thin film transistor (TFT) is formed. GH (Gust Host) liquid crystal layers LC each consisting of a GH (Gust Host) microcapsule film, and transparent electrodes (pixel electrodes) 38 are alternately stacked on the reflecting plate 36, and a glass substrate 44 with a transparent counter electrode 42 is finally stacked.

The GH microcapsule film is a material which contains a GH liquid crystal sealed in microcapsules with a diameter of a cell gap or less, and is processed to be pasty so that it can be applied onto a glass substrate. By volatilizing the paste solvent, a thin film can be formed on the substrate. With this material, the GH liquid crystal layers LC and the transparent electrodes (ITOs) 38 can be alternately stacked on the reflecting plate 36. The three GH microcapsule films contain coloring agents of cyan, magenta, and yellow, respectively.

The arrangements shown in FIGS. 1A and 1B are common to all the embodiments of the present invention shown in FIGS. 2A to 7.

Figure 2A:
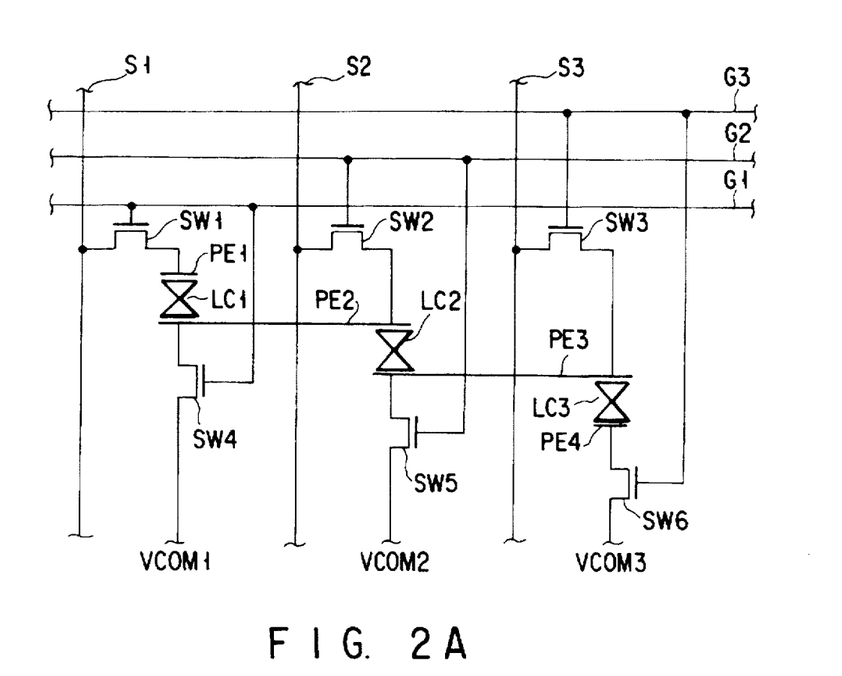
FIGS. 2A and 2B are a circuit diagram showing the configuration of one pixel in a liquid crystal display according to an embodiment of the present invention, and a timing chart showing the driving timings, respectively.

FIG. 2A shows the configuration of one pixel according to an embodiment of the present invention. Six active elements, i.e., switching elements (TFTs) SW1 to SW6, three GH liquid crystal layers LC1 to LC3, four pixel electrodes or counter electrodes PE1 to PE4, three signal lines S1 to S3, and three scanning lines G1 to G3 are arranged in one pixel. The GH liquid crystal layers 1C1, LC2, and LC3 are stacked to constitute one pixel. The signal lines S1 to S3 and the scanning lines G1 to G3 are respectively connected to the signal line driving IC 24 and the scanning line driving IC 26, as described above.

Figure 2B:
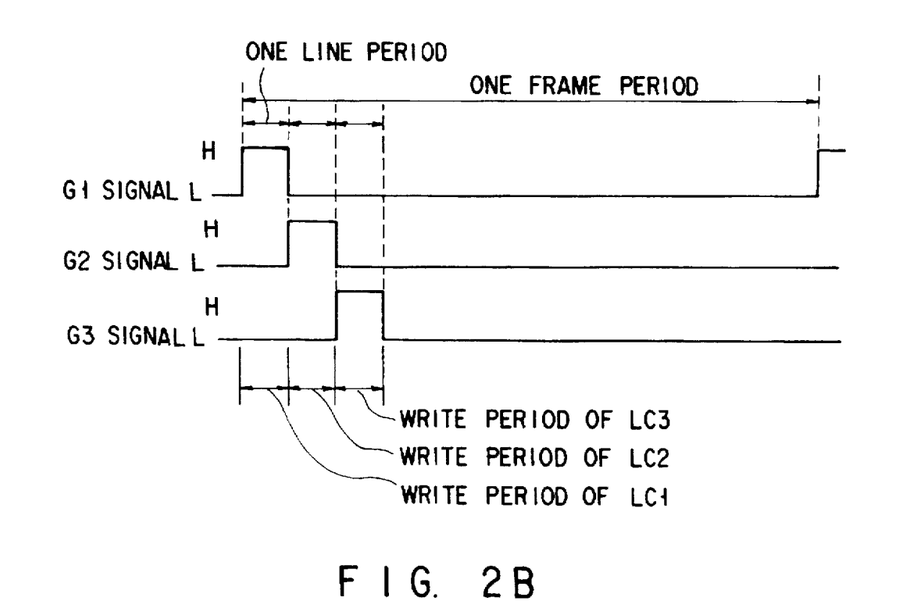

FIG. 2B shows the driving timings of the scanning lines for driving one pixel according to the embodiment shown in FIG. 2A. Signals for driving the GH liquid crystal layers LC1, LC2, and LC3 are time-divided into three periods.

The scanning line G1 is connected to the gate electrodes of the TFT SW1 and the TFT SW4. The signal line S1 is connected to the source electrode of the TFT SW1, and the drain electrode of the TFT SW1 is connected to the pixel electrode PE1. The GH liquid crystal layer LC1 is interposed between the pixel electrode PE1 and the counter electrode PE2. The counter electrode PE2 is connected to the source electrode of the TFT SW4, and the drain electrode of the TFT SW4 is connected to a reference power supply VCOM1. Since the counter electrode PE2 is also used as the pixel electrode of the GH liquid crystal layer LC2, the source electrode of the TFT SW4 is connected to the drain electrode of the TFT SW2.

The scanning line G2 is connected to the gate electrodes of the TFT SW2 and the TFT SW5, and the signal line S2 is connected to the source electrode of the TFT SW2. The GH liquid crystal layer LC2 is interposed between the pixel electrode PE2 and the counter electrode PE3. The pixel electrode PE2 is connected to the drain electrode of the TFT SW2 (and the source electrode of the TFT SW4), and the counter electrode PE3 is connected to the source electrode of the TFT SW5 (and the drain electrode of the TFT SW3). The drain electrode of the SW5 is connected to a reference power supply VCOM2.

The scanning line G3 is connected to the gate electrodes of the TFT SW3 and the TFT SW6, and the signal line S3 is connected to the source electrode of the TFT SW3. The GH liquid crystal layer LC3 is interposed between the pixel electrode PE3 and the counter electrode PE4. The pixel electrode PE3 is connected to the drain electrode of the TFT SW3 (and the source electrode of the TFT SW5), and the counter electrode PE4 is connected to the source electrode of the TFT SW6. The drain electrode of the TFT SW6 is connected to a reference power supply VCOM3.

The operation of the embodiment shown in FIG. 2A will be described below with reference to FIG. 2B. First, the scanning line G1 is changed to "H" level (e.g., 20 V) to turn on the TFT SW1 and the TFT SW4. The scanning lines G2 and G3 are at "L" level (e.g., 0 V), the TFTs except for the TFT SW1 and the TFT SW4 are in the OFF state, and the GH liquid crystal layers LC2 and LC3 are in a floating state. At this time, the pixel electrode PE1 has a signal line potential VS1, the counter electrode PE2 has the reference power supply potential VCOM1, and a voltage of VS1 -

VCOM1 is applied to the GH liquid crystal layer LC1. When the reference power supply voltage VCOM1 is 0 V, the molecular alignment state of the GH liquid crystal layer LC1 can be controlled to a color absorption state by setting the signal line potential VS1 at 0 V, or to a transparent state by setting it at 15 V.

Next, the scanning line G1 is changed to "L" level, and the scanning line G2 is changed to "H" level to turn on the TFT SW2 and the TFT SW5. With this setting, the GH liquid crystal layers LC1 and LC3 are set in a floating state. A voltage of a signal line potential VS2—the reference power supply voltage VCOM2 is applied to the GH liquid crystal layer LC2 to enable the control of its molecular alignment state. Similar to the above case, when the reference power supply voltage VCOM2 is 0 V, the amplitude of the signal line potential VS2 may be 15 V. Since the GH liquid crystal layer LC1 is set in a floating state, the potential difference of VS1–VCOM1 is held. Since the pixel electrode PE2 of the GH liquid crystal layer LC2 also serves as the counter electrode of the GH liquid crystal layer LC1, the potential of the GH liquid crystal layer LC1 is shifted by VS2.

Then, the scanning line G2 is changed to "L" level, and the scanning line G3 is changed to "H" level to turn on the TFT SW3 and the TFT SW6. With this setting, the GH liquid crystal layers LC1 and LC2 are set in a floating state. A voltage of a signal line potential VS3—the reference power supply voltage VCOM3 is applied to the GH liquid crystal layer LC3 to enable the control of its molecular alignment state. Similar to the above case, when the reference power supply voltage VCOM3 is 0 V, the amplitude of the signal line potential VS3 may be 15 V. Since the GH liquid crystal layers LC1 and LC2 are set in a floating state, the potential difference of VS1–VCOM1 and that of VS2–VCOM2 can be held. The GH liquid crystal layers LC1 and LC2 are shifted by VS3.

An image for one pixel can be displayed by performing the above driving method. According to this driving method, if the signal line potential is driven at an amplitude of 15 V, an image can be displayed. Therefore, a 15-V output IC is sufficient as the signal line driving IC for driving the signal line, and the signal line driving IC with a breakdown voltage of 15 V, which can provide an increase in speed and a decrease in cost, can be used.

Although the reference power supply potential VCOM is constant in the above description, polarity inversion driving is required to prevent a degradation in GH liquid crystal layers. In this case, the reference power supply voltage VCOM is used as an AC signal which changes between 0 and 15 V, and driving can be realized at a polarity opposite to that of signal line driving. The polarity inversion cycle is arbitrarily set to a frame cycle, a line cycle, or a cycle of a plurality of lines.

The scanning line driving signals shown in FIG. 2B respectively require one line period (about 35 [fs] for VGA of 640×480 pixels) in order to drive the GH liquid crystal layers LC1, LC2, and LC3, resulting in a total of 3 line periods. However, all the operations can be completed within one line period.

Although the embodiment shown in FIGS. 2A and 2B exemplifies the case wherein all the three layers are rewritten, all the layers need not be rewritten. That is, only a layer having received a signal different from that in a preceding frame is rewritten by changing the corresponding scanning line to "H" level. In this case, since the remaining layers are in a floating state, they keep signals in the preceding frame.

Figure 3A:
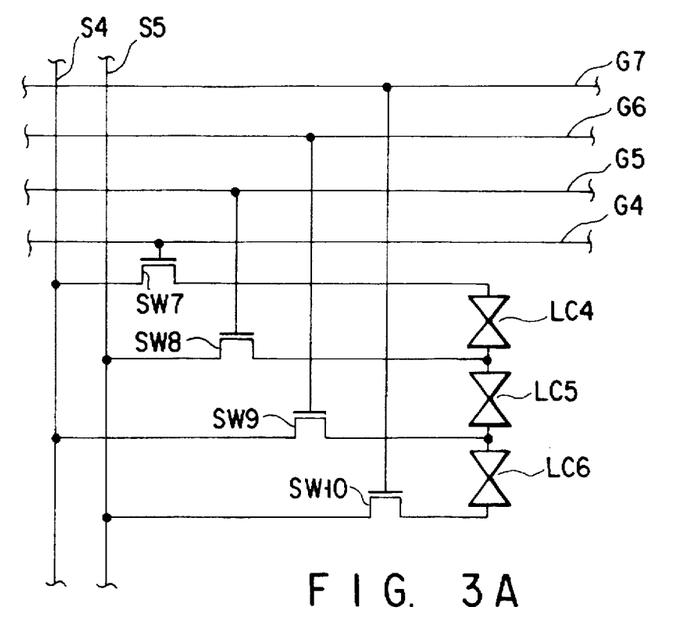
FIGS. 3A and 3B are a circuit diagram showing the configuration of one pixel in a liquid crystal display according to another embodiment of the present invention, and a timing chart showing the driving timings, respectively.

FIG. 3A shows the configuration of one pixel according to another embodiment of the present invention. Four active elements, i.e., switching elements (TFTs) SW7 to SW10, three GH liquid crystal layers LC4 to LC6, two signal lines S4 and S5, and four scanning lines G4 to G7 are arranged in one pixel. The GH liquid crystal layers LC4, LC5, and LC6 are stacked to constitute one pixel. A total of four pixel electrodes or four counter electrodes connected to the two terminals of the respective GH liquid crystal layers are not illustrated in FIG. 3A. The signal lines S4 and S5 and the scanning lines G4 to G7 are respectively connected to a signal line driving IC 24 and a scanning line driving IC 26, as described above (see FIG. 1A).

Figure 3B:
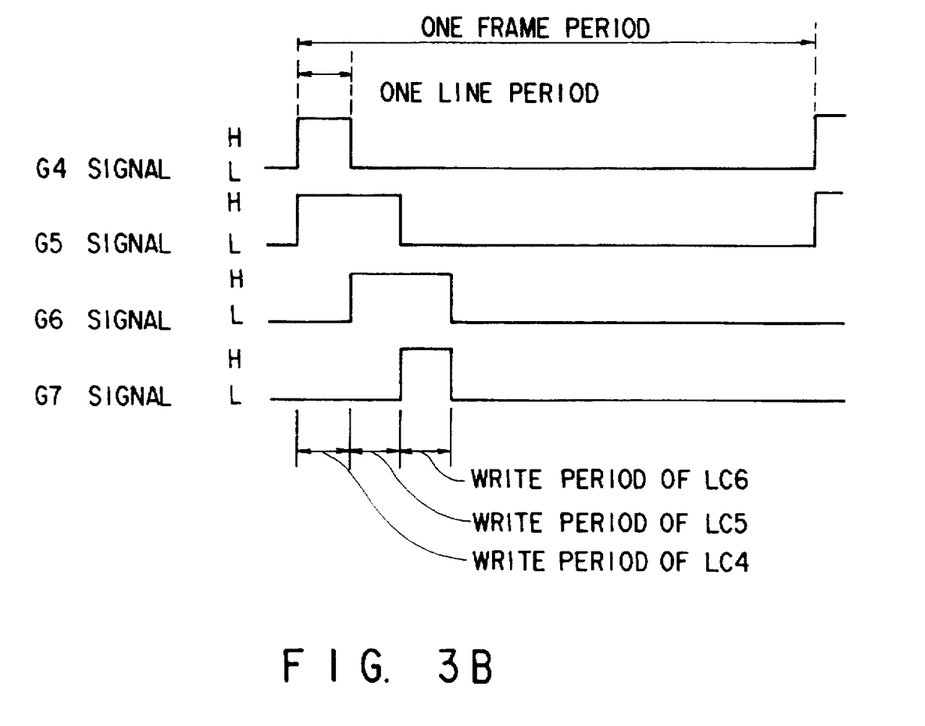

FIG. 3B shows the driving timings of the scanning lines for driving one pixel according to the embodiment shown in FIG. 3A. The period for driving the GH liquid crystal layers LC4, LC5, and LC6 are time-divided. The operation of the embodiment shown in FIG. 3A will be described below with reference to FIG. 3B.

First, the scanning lines G4 and G5 are changed to "H" level to turn on the TFT SW7 and the TFT SW8. The remaining scanning lines G6 and G7 are at "L" level, the TFT SW9 and the TFT SW10 are in the OFF state, and the GH liquid crystal layers LC5 and LC6 are in a floating state. At this time, a voltage VLC4 required to control the GH liquid crystal layer LC4 is applied across the signal lines S4 and S5 to control the molecular alignment state of the GH liquid crystal layer LC4. For example, if both the signal lines S4 and S5 are set at 0 V, the molecular alignment state can be controlled to a color absorption state; and if the signal line S4 is set at 15 V, and the signal line S5 is set at 0 V, it can be controlled to a transparent state.

Next, when the GH liquid crystal layer LC5 is to be controlled, only the scanning lines G5 and G6 are changed to "H" level; or when the GH liquid crystal layer LC6 is to be controlled, only the scanning lines G6 and G7 are changed to "H" level. By setting a desired potential difference between the signal lines S4 and S5, the molecular alignment state of the GH liquid crystal layer can be controlled. Since the remaining GH liquid crystal layers are in a floating state, a previous potential is held.

The scanning line driving signals shown in FIG. 3B respectively require one line period in order to drive the GH liquid crystal layers LC4, LC5, and LC6, resulting in a total of 3 line periods. However, all the operations can be completed within one line period. In addition, in the embodiment shown in FIGS. 3A and 3B, only a layer requiring rewrite processing can be rewritten.

Figure 4:
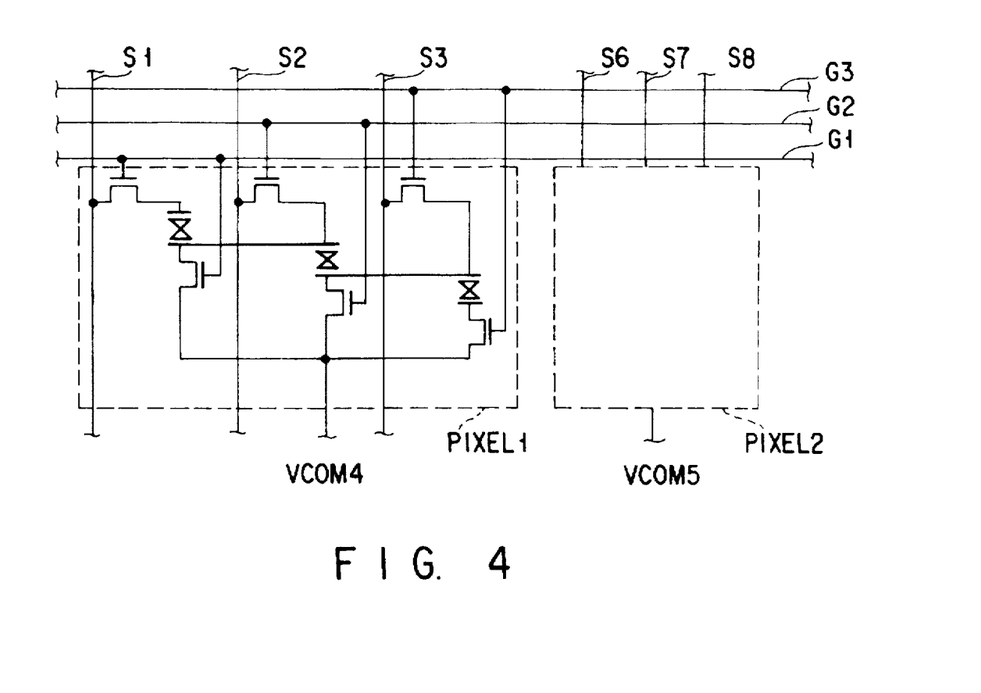
FIG. 4 is a circuit diagram showing the configuration of a plurality of pixels in a liquid crystal display according to still another embodiment of the present invention.

FIG. 4 shows still another embodiment of the present invention in which a plurality of pixels are arrayed, as in the case of FIG. 2A. The embodiment shown in FIG. 4 is characterized in that the polarity of a reference power supply potential VCOM is alternately inverted at every pixel. For example, in a pixel PIXEL1, a reference power supply potential VCOM4 is set at 0 V, and the signal line potential is at 0V (color absorption state) to 15 V (transparent state). In a pixel PIXEL2, a reference power supply voltage VCOM5 is set at 15 V, and the signal line potential is at 15 V (color absorption state) to 0 V (transparent state). In this manner, the pixels PIXEL1 and PIXEL2 are set to polarities opposite to each other. Further, the polarity is alternately inverted at every frame or line. With this operation, flicker components in adjacent pixels are canceled to obtain a good image free from flicker.

Figure 5:
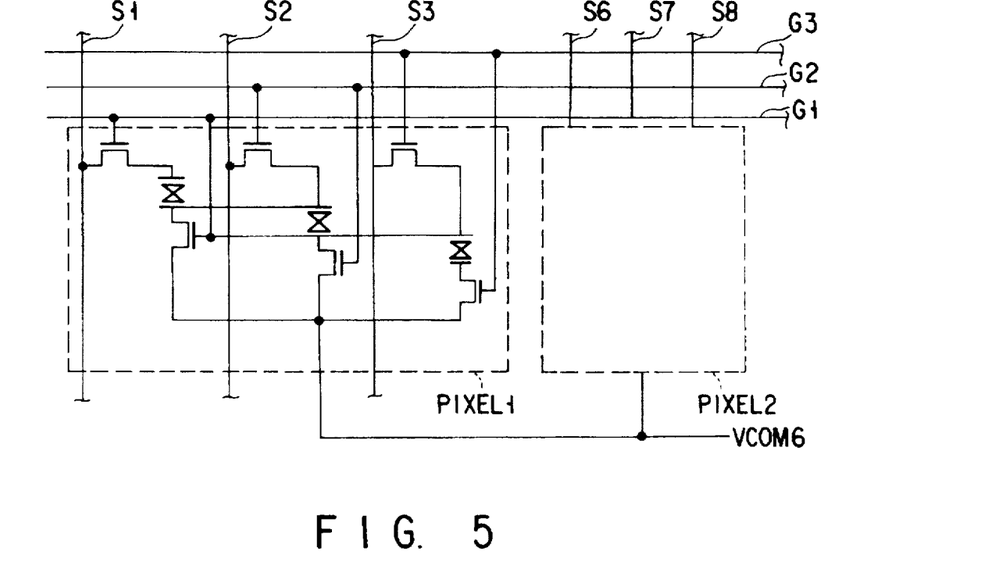
FIG. 5 is a circuit diagram showing the configuration of a plurality of pixels in a liquid crystal display according to still another embodiment of the present invention.

FIG. 5 shows still another embodiment of the present invention in which a plurality of pixels are arrayed, as in the case of FIG. 2A. The embodiment shown in FIG. 5 is characterized in that the reference power supply potential is commonly used for one line. In this configuration, driving is performed by inverting the polarity of a reference power supply potential VCOM6 at every line. Also in this driving method, a flicker component is canceled to obtain a good image.

Figure 6A:
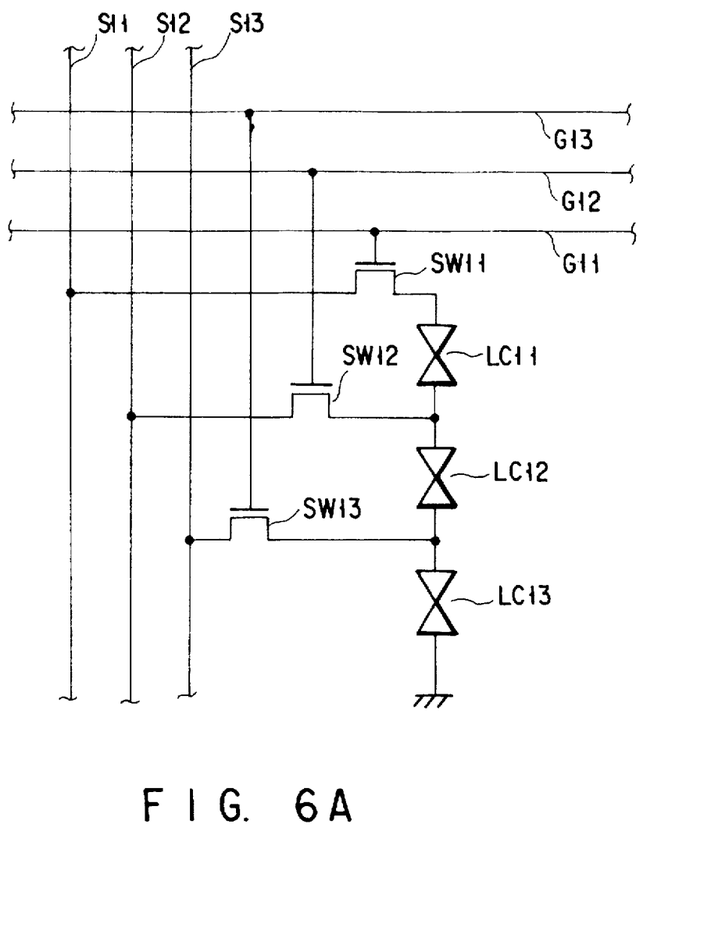
FIGS. 6A and 6B are a circuit diagram showing the configuration of one pixel in a liquid crystal display according to still another embodiment of the present invention, and a timing chart showing the driving timings, respectively.

FIG. 6A shows the configuration of one pixel according to still another embodiment of the present invention. Active elements, i.e., switching elements (TFTs) SW11 to SW13, GH liquid crystal layers LC11 to LC13, signal lines S11 to S13, and scanning lines G11 to G13 are arranged in one pixel. The GH liquid crystal layers LC11, LC12, and LC13 are stacked to constitute one pixel. A total of four pixel electrodes or four counter electrodes connected to the two terminals of the respective GH liquid crystal layers are not illustrated in FIG. 6A. The signal lines S11 to S13 and the scanning lines G11 to G13 are respectively connected to a signal line driving IC 24 and a scanning line driving IC 26, as described above (see FIG. 1A).

Figure 6B:
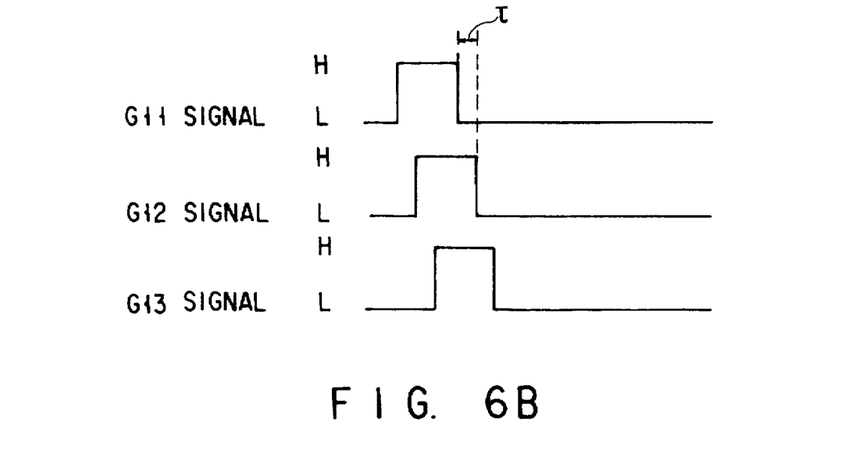

FIG. 6B shows the driving timings of the scanning lines for driving one pixel according to the embodiment shown in FIG. 6A. The operation of the embodiment shown in FIG. GA will be described below with reference to FIG. 6B.

First, if the scanning line G11 is changed to "L" level, the TFT SW11 is turned off. At this time, if the TFT SW12 and the TFT SW13 are in the ON state, the LC12 and LC13 are free from the influence of a feedthrough voltage via a parasitic capacitance generated by the turning-off of the TFT SW11. Next, the scanning line G12 is changed to "L" level by a delay τ to turn off the TFT SW12. At this time, since the TFT SW13 is in the ON state, and the TFT SW11 is in the OFF state, as described above, the LC11 and LC13 are free from the influence of the feedthrough voltage. Similarly, the scanning line G13 is changed to "L" level with the delay τ to turn off the TFT SW13. Assuming that the characteristics of the transistors do not vary, the final feedthrough voltage ΔV of each layer is expressed as follows:

$$\Delta V = C_{gs} V_g / (C_{gs} + C_{GH})$$

where $C_{gs}$: capacitance between gate and pixel $C_{GH}$: GH cell capacitance $V_g$: gate voltage More specifically, the same voltage can be applied to the three layers, though the voltage is equal to the feedthrough voltage in a conventional transmission TFT-LCD. When the three layers are simultaneously turned off, the feedthrough voltage of the LC11 is different from that of the LC12 in accordance with the voltages of the respective layers, so that complicated correction must be performed. However, in the embodiment shown in FIGS. 6A and 6B, since each layer is free from the influence of feedthrough, no correction is required.

Figure 7:
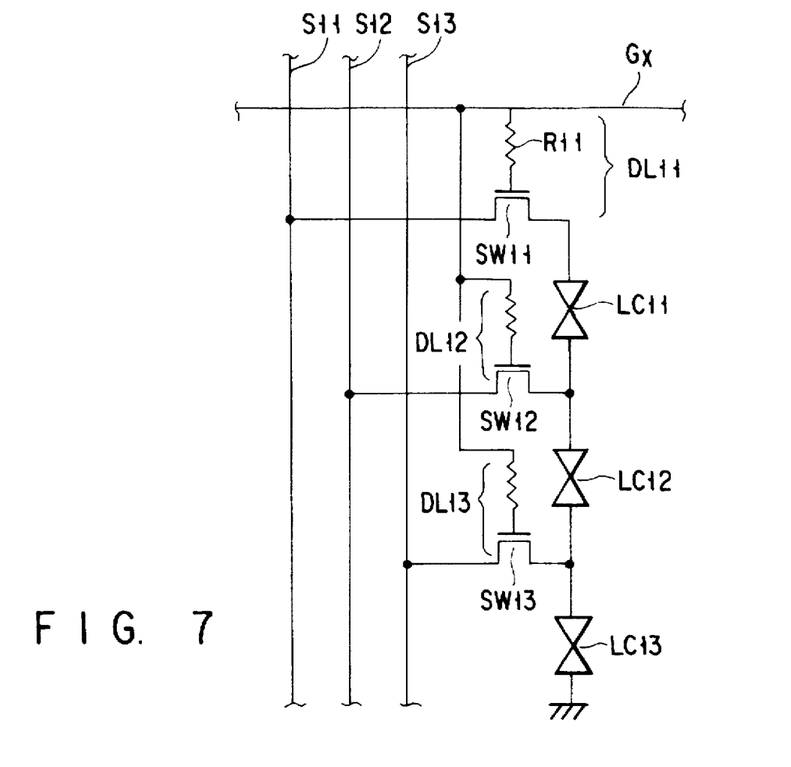
FIG. 7 is a circuit diagram showing the configuration of one pixel in a liquid crystal display according to still another embodiment of the present invention.

FIG. 7 shows the configuration of one pixel according to still another embodiment of the present invention. This embodiment is characterized in that only one scanning line Gx is used in place of three scanning lines. For this reason, different delay elements DL11 to DL13 (resistors R11 to R13 and gate capacitances Cg in this embodiment) are connected to the gates of active elements, i.e., switching elements (TFTS) SW11 to SW13 for driving respective layers. Time constants τ1, τ2, and τ3 of the respective delay elements DL11, DL12, and DL13 are expressed as follows:

$$\tau 1 = R11 \times Cg$$

$$\tau 2 = R12 \times Cg$$

$$\tau 3 = R13 \times Cg$$

Therefore, the resistors R11 to R13 are adjusted for required time constants to satisfy τ1<τ2<τ3. With this setting, even if the same signal is supplied to the preceding stage of the delay elements DL11 to DL13, different driving signals can be finally obtained, and the OFF timings of the transistors can be set such that the TFT SW11, the TFT SW12, and the TFT SW13 are turned off in this order.

Note that the auxiliary capacitances Cs shown in FIG. 13 are not illustrated in FIGS. 2A to 7. In actual, it is desirable to connect the auxiliary capacitances Cs parallel to the liquid crystal layers corresponding to one pixel in terms of a reduction in the dependence of a feedthrough voltage on a signal voltage. Note that three auxiliary capacitances Cs need to be provided for one pixel because the pixel has three liquid crystal layers.

As described above, according to the embodiments shown in FIGS. 2A to 5, a pixel consisting of three GH liquid crystal layers can be driven at a driving voltage (15 V) for one layer. Therefore, the driving IC can be increased in speed and reduced in cost, and further reduced in voltage, resulting in a low power consumption indispensable to a reflection display. Further, the polarity can be alternately inverted at very pixel to obtain a good image free from flicker.

According to the embodiments shown in FIGS. 6 and 7, variations in feedthrough voltage across three layers are reduced in a pixel consisting of three GH liquid crystal layers, and flicker, sticking, and a change in luminance are reduced to realize a high-quality image.

Next, a case wherein the present invention is applied to an LCD using a selective reflection mode with a cholesteric liquid crystal will be described.

Main liquid crystal display modes used at present, such as a TN mode, require polarizing plates. When a polarizing plate is used, however, the maximum optical utilization efficiency is 50% at most. For this reason, as a display mode using no polarizing plate, a polymer dispersion (PDLC) mode wherein a liquid crystal material is dispersed in a polymer material, the GH mode having been described with reference to FIGS. 1A and 1B, the selective reflection mode using the selective reflection characteristics of a cholesteric liquid crystal, and the like are proposed.

The selective reflection mode is proposed by George H. Heilmeier and Joel E. Goldmacher (RCA Lab. 1968). This mode utilizes the characteristics of the cholesteric liquid crystal which selectively reflects light having a specific wavelength due to a complicated twisted structure. More specifically, the cholesteric liquid crystal changes to three molecular alignment phases of a homeotropic phase, a planar phase, and a focalconic phase upon voltage application. In the homeotropic phase, all the liquid crystal molecules are orientated substantially perpendicular to a substrate surface, and the liquid crystal is in a transparent state with reflection of light having wavelengths out of a visible light region. In the planar phase, the helical axis of the liquid crystal is orientated substantially perpendicular to the substrate surface, and the liquid crystal is in a selective reflection state of selectively reflecting light having a specific wavelength. In the focalconic phase, the helical axis of the liquid crystal is orientated substantially parallel to the substrate surface, and the liquid crystal is in a reversely scattering transmission state of scattering all incident light.

Since the selective reflection mode performs a display by using the selective reflection state of the visible light region in the planar phase and the reverse scattering transmission state in the focalconic phase, it can perform a display with a relatively high contrast.

Figure 8:
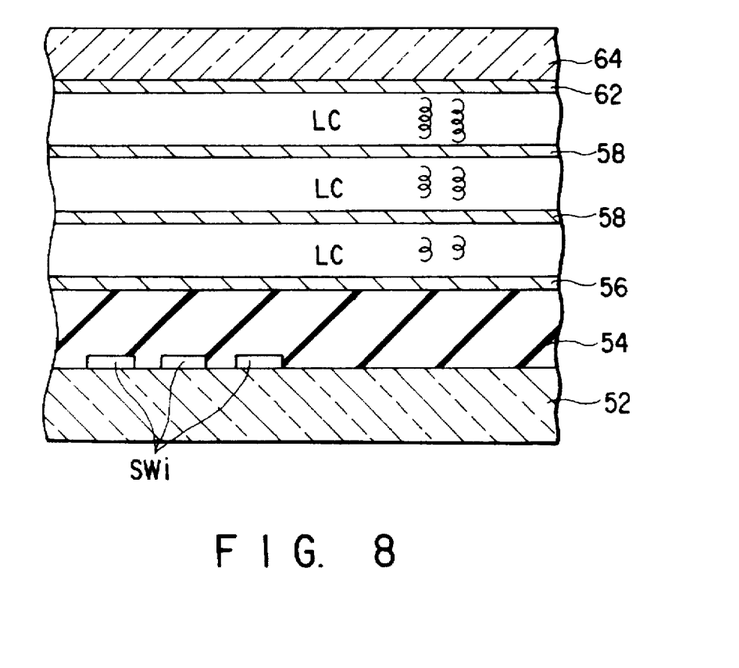
FIG. 8 is a sectional view schematically showing the arrangement of a liquid crystal panel of a selective reflection mode according to the present invention.

FIG. 8 schematically shows a sectional view of a liquid crystal panel according to the present invention in which three cell layers of the selective reflection mode are stacked. A reflecting plate (pixel electrode) 56 is arranged via an insulating film 54 on a glass substrate 52 on which an array of active elements consisting of, e.g., thin film transistors (TFTs), i.e., switching elements SWi are formed. Cholesteric liquid crystal layers LC and transparent electrodes (pixel electrodes) 58 are alternately stacked on the reflecting plate 56, and a glass substrate 64 with a transparent counter electrode 62 is finally stacked.

Figure 9:
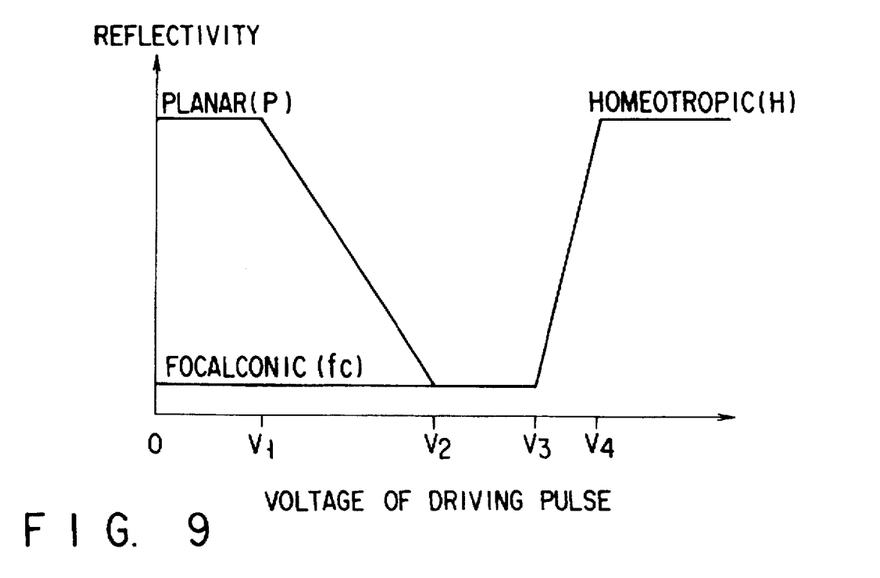
FIG. 9 is a graph showing the voltage-transmission characteristic of a cholesteric liquid crystal by exemplifying green reflection.

The cholesteric liquid crystal plastic material of each liquid crystal layer LC has a selective reflection color determined by the product $N \times P_O$ of a spontaneous pitch $P_O$ of the helix and an average refractive index N. Assume that the reflection colors of the respective liquid crystal layers LC are set to 380 nm to 530 nm (from blue to bluish green), 480 nm to 630 nm (from bluish green to reddish green), and 570 nm to 800 nm (from reddish green to red), respectively. FIG. 9 shows the voltage-reflection characteristic of the cholesteric liquid crystal by exemplifying green reflection. As shown in FIG. 9, two molecular alignment states of the planar (P) phase and the focalconic (fc) phase are present at a driving voltage of 0 V. From this result, it is found that the liquid crystal itself has a memory function.

The circuit configuration of a pixel in the liquid crystal panel of a selective reflection mode according to the present invention is basically the same as that of the liquid crystal panel of the above-described GH mode. That is, the circuits shown in FIG. 2A, 3A, 4, 5, 6A, and 7, which have been described with reference to the liquid crystal panels of a GH mode, can be directly applied to the liquid crystal panel of a selective reflection mode shown in FIG. 8. Therefore, the effect of the present invention as described in the above embodiments can also be obtained in an LCD of a selective reflection mode according to the present invention.

Figure 10:
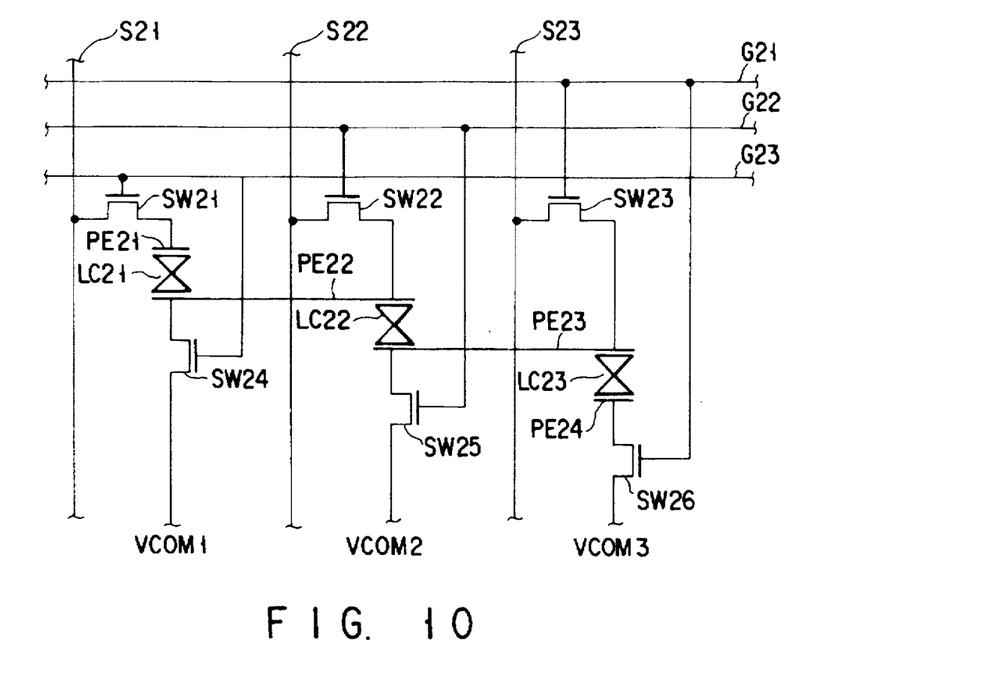
FIG. 10 is a circuit diagram showing the configuration of one pixel in a liquid crystal display according to still another embodiment of the present invention.

As an example, FIG. 10 shows the configuration of one pixel corresponding to the embodiment shown in FIG. 2A. Six active elements, i.e., switching elements (TFTs) SW21 to SW26, three liquid crystal layers LC21 to LC23, four pixel electrodes or four counter electrodes PE21 to PE24, three signal lines S21 to S23, and three scanning lines G21 to G23 are arranged in one pixel. The liquid crystal layers LC21, LC22, and LC23 are stacked to constitute one pixel. The signal lines S21 to S23 and the scanning lines G21 to G23 are respectively connected to a signal line driving IC 24 and a scanning line driving IC 26, as described above (see FIG. 1A).

Figure 11:
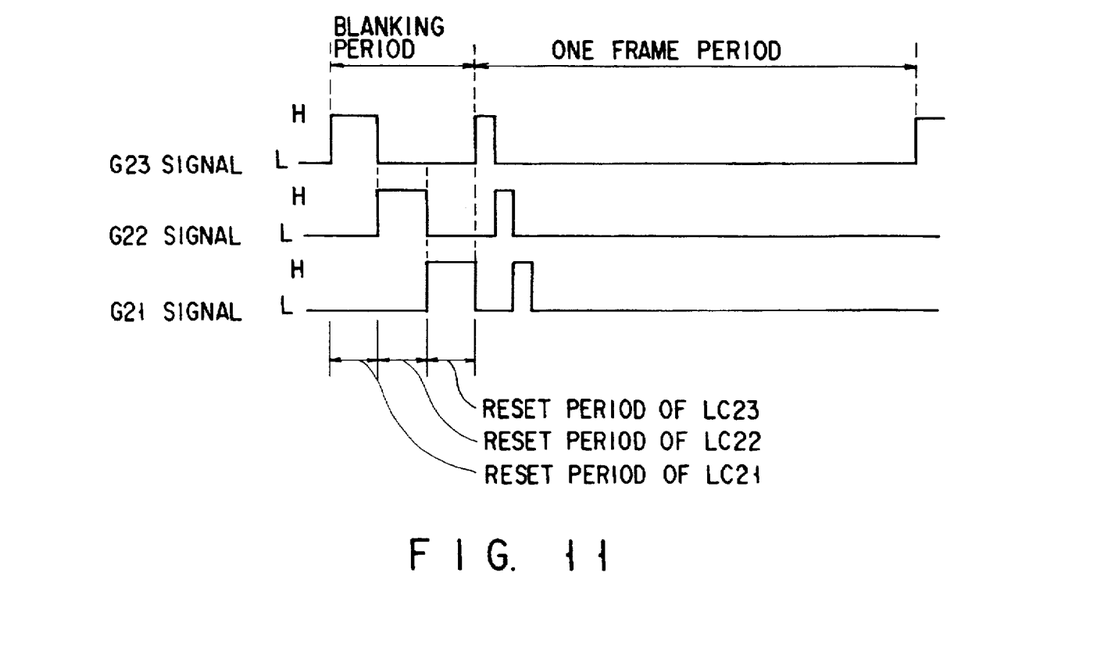
FIG. 11 is a timing chart showing the driving timings of the liquid crystal display shown in FIG. 10.

FIG. 11 shows the driving timings of the scanning lines for rewriting one pixel according to the embodiment shown in FIG. 10.

Since the liquid crystal itself has a memory function, as is apparent from FIG. 9, the liquid crystal must be reset once to the homeotropic phase in rewrite processing. Since the response speed of the cholesteric liquid crystal is in a millisecond (ms) order, the reset time requires a time equal to this speed. That is, a given pixel must be reset several milliseconds before rewriting this pixel.

As this reset method, one can be selected from the following methods. According to one method, a reset pulse is supplied in advance before rewrite processing via the auxiliary capacitance Cs. According to another method, a reset voltage is substantially simultaneously applied to R, G, and B via a signal line by using part of a normal driving time. According to still another method, reset timings are shifted from each other such that G is driven after R is reset, or B is driven when G is reset. Still another method is a blanking reset method of resetting all pixels in a vertical blanking period (period for shifting a given frame to a next frame).

FIG. 11 exemplifies the blanking reset method. The vertical blanking period is divided to three parts, and the respective parts are used as the reset periods of the liquid crystal layers LC21 (R), LC22 (G), and LC23 (B). Normally, to obtain the homeotropic phase, a high voltage of 20 V or more is required, leading to 60 V or more for three layers. However, if the liquid crystal is driven so as to set two remaining layers in a floating state, as in this embodiment, the liquid crystal can be sufficiently driven at 20 V. In addition, since the vertical blanking period occupies about 10% of one field, the reset period is assigned 1.5 ms to 2 ms. For this reason, even if the response speed is low, the liquid crystal can be reset sufficiently. Upon the reset processing, the gates for R, G, and B are sequentially turned on to write data, as in the GH mode. The liquid crystal can be changed from the homeotropic phase to the focalconic phase or the planar phase.

The liquid crystal panel shown in FIG. 8 reflects only circularly polarized light in a given rotational direction (e.g., a clockwise direction) in each liquid crystal layer, but cannot control light rotating in a reverse direction. For this reason, the liquid crystal panel has the maximum reflectivity of 50% at most.

Figure 12:
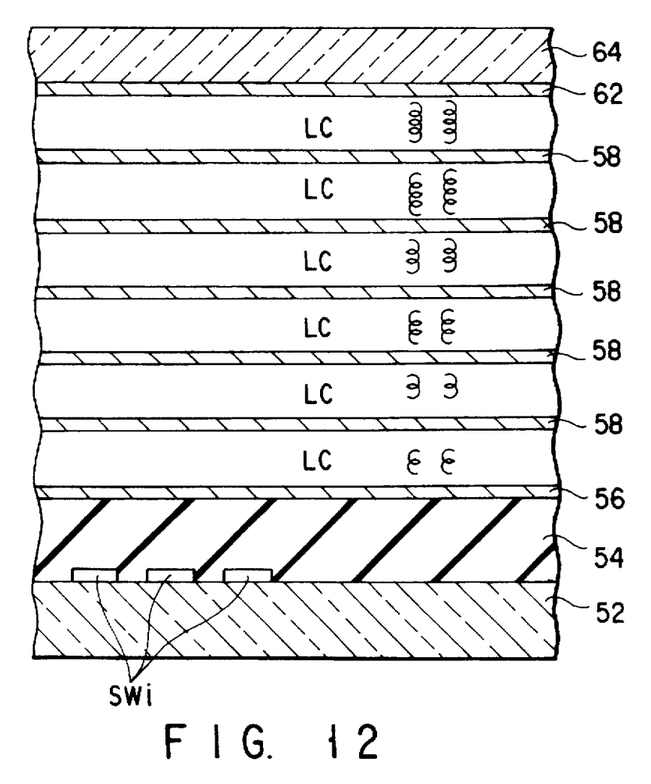
FIG. 12 is a sectional view schematically showing the arrangement of another liquid crystal panel of a selective reflection mode according to the present invention.

FIG. 12 schematically shows a sectional view of a liquid crystal panel according to the present invention in which six cell layers of the selective reflection mode are stacked. With this arrangement, the liquid crystal panel can reflect circularly polarized light in both clockwise and counterclockwise directions, so that the liquid crystal panel can have a high reflectivity. In the case of six liquid crystal layers, the liquid crystal panel can be driven by a manner substantially similar to the case of three liquid crystal layers except that the number of phases is six.

When the number of liquid crystal layers is increased to six in this manner, if the reset voltage of each liquid crystal layer is, e.g., 20 V, the total reset voltage results in 120 V in the conventional structure. That is, a high-breakdown-voltage driver which is as high in cost as a plasma display must be used. In addition, if the driving voltage increases, the driving voltage of a given pixel greatly affects the voltage of another pixel to cause crosstalk and EM1, considerably degrading the image quality.

In contrast, in the liquid crystal panel of the present invention, the total reset voltage is 20 V. Therefore, the liquid crystal panel can be sufficiently driven by a low-cost, middle-breakdown-voltage driver. Further, the above-described problems of crosstalk and the like can be eliminated.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal display comprising:
   a plurality of pixels arranged in a matrix format, each pixel having a plurality of liquid crystal layers and a plurality of transparent electrodes which are alternately stacked on a first electrode functioning as a reflecting plate to display a plurality of different colors, and switching means connected to said first electrode and said transparent electrodes to control potential information supplied to said liquid crystal layers;

a plurality of signal lines connected to said switching means of said pixels to supply an image signal to said pixels;

a plurality of scanning lines connected to said switching means of said pixels to supply a scanning signal for selecting said pixels; and control means for driving said signal lines and said scanning lines, said control means causing, in each pixel, at least one of each pair of electrodes interposing remaining liquid crystal layers to be a floating state by said switching means, while controlling potential information of one liquid crystal layer by said switching means, said pair of electrodes being included in said first electrode and said transparent electrodes.

2. A display according to claim 1, wherein said control means time-divisionally supplies the potential information among said liquid crystal layers.

3. A display according to claim 1, wherein said control means alternately inverts a polarity of said liquid crystal layers at every pixel, at every line, or at every pixel and every line.

4. A display according to claim 1, wherein said switching means comprises a plurality of switching elements respectively connected to said first electrode and said transparent electrodes, and said control means turns on and off said switching elements at different timings.

5. A display according to claim 1, wherein said transparent electrodes comprise second and third electrodes;

said liquid crystal layers comprise a first liquid crystal layer arranged between said first and second electrodes, and a second liquid crystal layer arranged between said second and third electrodes;

said switching means comprises a first main switching element and a first auxiliary switching element respectively connected-to said first and second electrodes, and a second main switching element and a second auxiliary switching element respectively connected to said second and third electrodes;

said signal lines comprise a first signal line connected to said first electrode via said first main switching element, and a second signal line connected to said second electrode via said second main switching element; and said scanning lines comprise a first scanning line connected to said first main and auxiliary switching elements, and a second scanning line connected to said second main and auxiliary switching elements.

6. A display according to claim 5, wherein said transparent electrodes further comprise a fourth electrode;

said liquid crystal layers further comprise a third liquid crystal layer arranged between said third and fourth electrodes;

said switching means further comprises a third main switching element and a third auxiliary switching element respectively connected to said third and fourth electrodes;

said signal lines further comprise a third signal line connected to said third electrode via said third main switching element; and said scanning lines further comprise a third scanning line connected to said third main and auxiliary switching elements.

7. A display according to claim 1, wherein said transparent electrodes comprise second and third electrodes;

said liquid crystal layers comprise a first liquid crystal layer arranged between said first and second electrodes, and a second liquid crystal layer arranged between said second and third electrodes;

said switching means comprises first, second, and third switching elements respectively connected to said first, second, and third electrodes; and said scanning lines comprise first, second, and third scanning lines connected to said first, second, and third switching elements.

8. A display according to claim 7, wherein said transparent electrodes further comprise a fourth electrode;

said liquid crystal layers further comprise a third liquid crystal layer arranged between said third and fourth electrodes;

said switching means further comprises a fourth switching element connected to said fourth electrode; and said scanning lines further comprise a fourth scanning line connected to said fourth switching element.

9. A display according to claim 1, wherein said liquid crystal layers are constituted by guest host liquid crystal layers.

10. A display according to claim 1, wherein said liquid crystal layers are constituted by cholesteric liquid crystal layers.

11. A liquid crystal display, comprising:

a plurality of pixels arranged in a matrix format, each pixel having a plurality of liquid crystal layers and a plurality of transparent electrodes which are alternately stacked on a first electrode functioning as a reflecting plate to display a plurality of different colors, and switching means connected to said first electrode and said transparent electrodes to control potential information supplied to said liquid crystal layers;

a plurality of signal lines connected to said switching means of said pixels to supply an image signal to said pixels;

a plurality of scanning lines connected to said switching means of said pixels to supply a scanning signal for selecting said pixels; and control means for driving said signal lines and said scanning lines, said control means controlling said respective liquid crystal layers in each pixel such that phases of their driving signals are different.

12. A display according to claim 11, wherein said plurality of liquid crystal layers are respectively driven by separate scanning lines of said scanning lines in each pixel, and the phases of the driving signals supplied to said separate scanning lines are different.

13. A display according to claim 12, wherein said transparent electrodes comprise second and third electrodes;

said liquid crystal layers comprise a first liquid crystal layer arranged between said first and second electrodes, and a second liquid crystal layer arranged between said second and third electrodes;

said switching means comprises first and second switching elements respectively connected to said first and second electrodes;

said signal lines comprise a first signal line connected to said first electrode via said first switching element, and a second signal line connected to said second electrode via said second switching element; and said scanning lines comprise first and second scanning lines respectively connected to said first and second switching elements.

14. A display according to claim 13, wherein said transparent electrodes further comprise a fourth electrode;

said liquid crystal layers further comprise a third liquid crystal layer arranged between said third and fourth electrodes;

said switching means further comprise a third switching element connected to said third electrode; and said scanning lines further comprise a third scanning line connected to said third switching element.

15. A display according to claim 11, wherein said plurality of liquid crystal layers in each pixel are driven by a common scanning line via delay elements having different time constants.

16. A display according to claim 15, wherein said transparent electrodes comprise second and third electrodes;

said liquid crystal layers comprise a first liquid crystal layer arranged between said first and second electrodes, and a second liquid crystal layer arranged between said second and third electrodes;

said switching means comprises first and second switching elements respectively connected to said first and second electrodes;

said signal lines comprise a first signal line connected to said first electrode via said first switching element, and a second signal line connected to said second electrode via said second switching element; and said delay elements comprise first and second delay elements for respectively connecting said common scanning line to said first and second switching elements.

17. A display according to claim 16, wherein said transparent electrodes further comprise a fourth electrode;

said liquid crystal layers further comprise a third liquid crystal layer arranged between said third and fourth electrodes;

said switching means further comprise a third switching element connected to said third electrode; and said delay elements further comprise a third delay element for connecting said common line to said third switching element.

18. A display according to claim 16, wherein each of said delay elements comprises a resistor.

19. A display according to claim 11, wherein said liquid crystal layers are constituted by guest host liquid crystal layers.

20. A display according to claim 11, wherein said liquid crystal layers are constituted by cholesteric liquid crystal layers.

* * * * *